(12) United States Patent
Moulin et al.

(10) Patent No.: US 11,361,058 B2
(45) Date of Patent: Jun. 14, 2022

(54) METHOD USED IN A MOBILE EQUIPMENT WITH A TRUSTED EXECUTION ENVIRONMENT FOR AUTHENTICATING A USER BASED ON HIS FACE

(71) Applicant: KeyLemon S.A., Martigny (CH)

(72) Inventors: Francois Moulin, Volleges (CH); Alain Fogel, Eglharting (DE)

(73) Assignee: KeyLemon S.A., Martigny (CH)

( * ) Notice: Subject to any disclaimer, the term of this patent is extended or adjusted under 35 U.S.C. 154(b) by 748 days.

(21) Appl. No.: 16/233,891

(22) Filed: Dec. 27, 2018

(65) Prior Publication Data
US 2019/0205518 A1 Jul. 4, 2019

(51) Int. Cl.
| | |
|---|---|
| G06F 12/00 | (2006.01) |
| G06F 21/32 | (2013.01) |
| G06N 3/02 | (2006.01) |
| G06F 21/53 | (2013.01) |
| G06V 30/194 | (2022.01) |
| G06V 40/16 | (2022.01) |

(52) U.S. Cl.
CPC .............. G06F 21/32 (2013.01); G06F 21/53 (2013.01); G06N 3/02 (2013.01); G06V 30/194 (2022.01); G06V 40/172 (2022.01)

(58) Field of Classification Search
CPC ....................................................... G06F 12/00
See application file for complete search history.

(56) References Cited

U.S. PATENT DOCUMENTS

2015/0078681 A1\* 3/2015 Damola ............. G06K 9/00979
382/305
2019/0384965 A1\* 12/2019 Rodriguez ......... G06K 9/00711

\* cited by examiner

*Primary Examiner* — Olisa Anwah
(74) *Attorney, Agent, or Firm* — Michael Best & Friedrich LLP

(57) ABSTRACT

A method used in a mobile equipment for authenticating or identifying a user based on his face includes acquiring a sequence of biometric face sample corresponding to successive image frames of the user in a Trusted Execution Environment of the mobile equipment, and, in the Trusted Execution Environment, modifying or replacing some of the biometric face samples in the sequence, so as to generate a modified sequence with test biometric face samples. The method includes transmitting the modified sequence to a Rich Execution Environment of the mobile equipment, and classifying at least one portion of the biometric face samples using a classifier in the Rich Execution Environment, so as to generate for each classified biometric face sample a set of intermediary outputs and a classification result. The method also includes, for each classified biometric face sample, sending at least some of the intermediary outputs or classification result, and/or a digest of the intermediary outputs, to the Trusted Execution Environment. The method further includes, for at least one test biometric face sample, verifying the at least some of the intermediary outputs and/or result and/or digest in the Trusted Execution Environment.

23 Claims, No Drawings

METHOD USED IN A MOBILE EQUIPMENT WITH A TRUSTED EXECUTION ENVIRONMENT FOR AUTHENTICATING A USER BASED ON HIS FACE

CROSS-REFERENCE TO RELATED APPLICATIONS

This application claims the benefit of priority of European Patent Application No. 17211227, filed on Dec. 29, 2017, which is incorporated herein by reference in its entirety.

FIELD OF THE DISCLOSURE

The present invention is related with the execution of face processing software in mobile equipment such as smartphones, tablets, laptops, webcams and the like.

BACKGROUND

Mobile equipment often use processors with two environments for the execution of programs, one user-facing environment in which most applications run in an operating system such as Android, iOS, Windows, etc, and another isolated environment that runs in parallel with this operating system, and which guarantees that code and data loaded inside to be protected with respect to confidentiality and integrity. The user-facing environment is often called the Rich Execution Environment (REE) while the secure execution environment is called the Trusted Execution Environment (TEE). TEE are defined by the Open Mobile Terminal Platform (OMTP) in the 'Advanced Trusted Environment: OMTP TR1' version 1.1 standard, which is incorporated herein by reference.

As an example, some ARM processors have a TrustZone as a specific implementation of a TEE.

In some devices, software executed in the TEE can use only one single core of the main processor, while software executed in the REE can access more cores, and/or additional hardware processing modules such as a graphic processor, a neural network and the like. Frequently, the REE has also access to more memory than the TEE. In some devices, some sensors, like a fingerprint sensor, a camera etc can only be accessed from the TEE.

Generally, software executed in the TEE is more secure but slower than software executed in the REE.

The separation between the trusted and Rich Execution Environment can be done via a physical separation of CPU's, GPU, memories, drivers etc and/or by time-sharing the CPU and/or other components.

In some implementations, a single bit (the "non-secure bit) in a secure configuration register indicates whether a module has access to the resources of the TEE or to the resources of the REE.

It is usually possible to communicate between the two environments.

Software for which security is crucial are often run entirely in the TEE. For example, some mobile equipments comprise a fingerprint authentication feature for authenticating the user of the device with his fingerprints that are captured with a fingerprint sensor in order to unlock the device. The module frequently comprises fingerprint sensor drivers, a fingerprint database, fingerprint user applications, etc which are entirely executed in the Trusted Execution Environment, so that the authentication can not be compromised.

Apart from fingerprints, user authentication based on face recognition is becoming increasingly popular on mobile equipment. The combination of non-intrusiveness, small surface requirement, and no need to contact the device makes it more and more prevalent on smartphones, among others. However, the computing power that is required to achieve an accurate and high confidence recognition is very high, so that executing face recognition software in the Trusted Execution Environment of many mobile equipment leads to unacceptable recognition time.

The computing and memory requirements are especially high for 3D face recognition, i.e. when the recognition is based on 3D sensors, often in addition to a visible light and to an infrared sensor. Although 3D face recognition improves the reliability of the face recognition, it also generates biometric samples with more information than conventional 2D face recognition, and thus requires a more complex classifier, for example a neural network with more inputs and often more layers, in order to match the biometric samples with test images. A fast classification of 3D face images, for example in order to unlock a mobile equipment, requires a neural network, a graphic processor and/or additional cores of the CPU which are usually not available from the Trusted Execution Environment.

SUMMARY

In some implementations, the foregoing drawbacks are avoided, and the present disclosure allows a fast and secure execution of face recognition software and drivers in mobile equipment.

According to some implementations, these aims are achieved by a method used in a mobile equipment for authenticating or identifying a user based on his face, comprising:
acquiring a sequence of biometric face sample corresponding to successive image frames of the user in a Trusted Execution Environment of the mobile equipment;
transmitting the sequence to a Rich Execution Environment of the mobile equipment;
classifying at least one portion of the biometric face samples using a classifier in the Rich Execution Environment, so as to generate for each classified biometric face sample a set of intermediary outputs and preferably a classification result;
for each classified biometric face sample, sending at least some of the intermediary outputs or classification result, and/or a digest of the intermediary outputs, to the Trusted Execution Environment;
verifying the at least some of the intermediary outputs and/or result and/or digest in said Trusted Execution Environment.

In some implementations, these aims also are achieved by a method used in a mobile equipment for authenticating or identifying a user based on his face, comprising:
acquiring a sequence of biometric face sample corresponding to successive image frames of the user in a Trusted Execution Environment of the mobile equipment;
in the Trusted Execution Environment, modifying or replacing some of the biometric face samples in said sequence, so as to generate a modified sequence with test biometric face samples;
transmitting the modified sequence to a Rich Execution Environment of the mobile equipment;

classifying at least one portion of the biometric face samples using a classifier in the Rich Execution Environment, so as to generate for each classified biometric face sample a set of intermediary outputs and preferably a classification result;

for each classified biometric face sample, sending at least some of the intermediary outputs or classification result, and/or a digest of the intermediary outputs, to the Trusted Execution Environment;

for at least one test biometric face sample, verifying the at least some of the intermediary outputs and/or result and/or digest in said Trusted Execution Environment.

The idea is to use, as much as possible, the computing power of the Rich Execution Environment while preserving the security of the computation even if the Rich Execution Environment is compromised.

According to one aspect, the regular processing that is required for face authentication is performed at least partially in the Rich Execution Environment, and a verification of the results is performed in the Trusted Execution Environment, so that hacks can be detected.

The verification can be performed on some of the biometric face samples only, and not on all image frames or corresponding biometric face samples. Since the Rich Execution Environment does not know which samples will be verified, the probability that a hack remains undetected is very low.

DETAILED DESCRIPTION OF EXAMPLE EMBODIMENTS

We assume that the face recognition method that we want to execute is composed of a list of steps, each step takes several inputs and returns several outputs that are used as input for the next step. The idea in some implementations is the following:

1. Retrieve a sequence of biometric face samples in the Trusted Execution Environment. Each biometric face sample can be obtained by pre-processing one image frame in a sequence of images received from one or a plurality of image sensors, for example a RGB sensor, a near-infrared sensor, and a depth sensor, and transmitting those images over DMA to a memory of the TEE.
2. Modify or replace at least one biometric face sample in the sequence, so as to generate a modified sequence with at least one test biometric face sample. The purpose of the test biometric sample is to test if the classifier in the Rich Execution Environment performs correctly and has not been hacked; when there is no hack, the user authentication does not depend on the test biometric samples.
3. Send the modified sequence of biometric face samples, including the test biometric face sample(s), to the Rich Execution Environment.
4. Classify the biometric face samples in the Rich Execution Environment.
5. Send the classification results (if available), intermediary outputs of the classifiers, and/or a digest thereof, to the Trusted Execution Environment.
6. In the Trusted Execution Environment, verify that the result, the intermediary outputs and/or the digest that are received for the test biometric face sample(s) are correct.
7. If there is a difference between the values computed in the REE and the values expected in the TEE (for example values that were computed in advance, or on the fly), refuse the user authentication.

The biometric face samples which are replaced or modified are chosen randomly using a random generator located inside the Trusted Execution Environment. For example, in a sequence of N image frames corresponding after pre-processing to N biometric face samples, M arbitrarily selected biometric face samples may be replaced or modified.

It is important that the software in the REE cannot detect which biometric face samples have been modified or replaced. Therefore, according to one aspect, the test biometric face samples that are used for replacing genuine biometric face samples are changed, so that an attacker in the REE cannot detect multiple uses of a same sample that could correspond to a test biometric face sample.

In one aspect, test biometric face samples are selected from an available collection of test samples; if the number of samples in the collection is large enough, the probability that a single biometric face sample is used several times ant this new use remains undetected is lower.

According to another aspect, new test biometric face samples are regularly generated and saved, while already used test biometric face samples are deleted after one or a limited number of uses. New test biometric face samples might for example correspond to image frames actually captured with the device, for example images frames of the same user and/or in the same environment.

The modified biometric face samples might be generated from actually existing biometric face samples, for example samples of the current sequence or from previous sequences, by applying hardly detectable modifications, such as noise, digital watermarks, or filters. Since the biometric face samples are almost identical to other samples from the current or previous sequence, it is very difficult for an attacker to distinguish them from the genuine biometric face samples.

A module in the TEE verifies the user classification of at least some of the test biometric face sample performed in the REE; a misclassification, for example an attempt to authenticate an image frame who does not match a (or the) reference image of an authorized user, might be a sign that the module or the hardware in the REE is corrupt and that any authentication should be rejected.

The verification of the classification in the TEE might be based on a comparison of the classification result provided by the REE with expected results.

A higher security might be achieved by verifying not only the classification result (i.e., if the user should be authenticated, or his identity), but also intermediary outputs of the classification process. For example, if the classifier in the REE uses a neural network, the intermediary results might include values provided by some of the first or intermediate layers of the network.

In some embodiments, the REE computes a digest, for example a hash, of those intermediary outputs and result (if any), and sends this digest to the TEE. The verification is then based on a comparison between the digest received from the REE and the expected value of the digest. This reduces the amount of data to be transmitted from the REE to the TEE, without compromising the security.

The verification in the TEE is based on expected values for the result, intermediary outputs and digest (hash). Those expected values might be computed in the TEE in advance (off-line), so that the computation time has no impact on the speed of user authentication. Alternatively, if an extremely fast detection of attacks of the classifier in the REE is not required, the expected values might be computed on the fly, for example simultaneously in the TEE and in the REE, or after reception of the values in the TEE.

In case of face recognition, we only are interested to validate positive matches. If the Rich Execution Environment doesn't recognize the face, we don't need to validate the result since preventing the user to be authenticated is not a security risk. Therefore, in one embodiment, a verification of the results, intermediary outputs or digests in only performed in the TEE in case of positive matching results (when a user has been authenticated in the REE).

Face recognition comprises two main steps: the face detection and the face matching. The goal of the face detection is to find the bounding box of the face in an image and to detect some facial landmarks of faces (e.g., eyes, mouth, nose). Face detection is usually resolved by scanning the input image for faces, i.e. by splitting the image into regions and classifying each region as a face or not.

In some embodiments, the face detection is performed in the Rich Execution Environment, and verified in the Trusted Execution Environment. Preferably, only positive results are verified (i.e., when the user has been authenticated or identified), i.e. the software in the TEE only verifies the presence of faces in regions identified by the program in the REE.

The face matching can use a classifier, for example a neural network, for classifying a frame or a region of a frame in which a face has been previously detected and for indicating whether this frame or regions corresponds to a test model of the user one wants to authenticate. The neural network comprises typically several layers, each layer computing intermediary outputs that are used as inputs for the neurons of the next layer. In one embodiment, the classification uses a neural network in the Rich Execution Environment that delivers outputs, and possibly a final classification result, to the Trusted Execution Environment.

The Trusted Execution Environment comprises a neural network which is equivalent to the neural network in the Rich Execution Environment, as will be described. It computes results, intermediary outputs and/or digests for the test biometric samples, and compares those expected values with the ones provided by the REE in order to detect any error.

Therefore, the processing power that is needed in the Trusted Execution Environment is reduced since only regions of images in which a face has been detected and authenticated are verified, and only a random subset of all the biometric face samples are tested, preferably by comparing with expected values that can be computed off-line, for example in advance.

A neural network used for 3D face authentication typically comprises a large number of inputs, and several layers. Most of the computing power and memory is required by the first layers of the network, in particular by the first layer. Therefore, in one embodiment, only one or some of the first layer(s) of the neural network classifier are computed in the Rich Execution Environment and verified in the Trusted Execution Environment; the output layer(s) of the neural networks are directly computed in the Trusted Execution Environment.

The method also can comprise a step of pre-processing the images received from the image sensors, and to correct the illumination, contrast, white balance, remove shadows, crops less interesting regions, etc. the pre-processing is preferably performed in the Trusted Execution Environment, to avoid any hack during this pre-processing. Alternatively, some steps of pre-processing can be executed in the Rich Execution Environment, for example in order to access a graphical processor or a DSP or additional cores in the Rich Execution Environment. If those steps are critical, the correct execution can be validated by re-computing a subset in the Trusted Execution Environment.

The computations which are first done in the Rich Execution Environment and then verified in the Trusted Execution Environment use equivalent neural networks or equivalent portions of neural networks. "Equivalent" means in this context that the neural networks or portions of neural networks have the same structure (same number of neurons in each layer; same inter-connections between neurons) and have been programmed during enrolment to have the same weights in all duplicated neurons, so that a same input will deliver the same intermediary outputs or results. However, the neural networks might be based on different hardware and/or software; for example, the neural network in the Rich Execution Environment might use a hardware based neural network, such as a dedicated processor or library, while the neural network in the Trusted Execution Environment might be based on software executed by a general-purpose processor.

The method can also comprise a user presence detection step, performed before the face detection that is only executed if a user is actually in front of the equipment. The presence detection is not a security critical step and can be executed in the Rich Execution Environment. Alternatively, it can be executed in the Trusted Execution Environment.

The above described method also can be used for identifying users based on their face.

In a first example use case, the above described method is used for continuously monitoring and authenticating the user in front of the mobile equipment, for example in order to unlock the equipment in case of positive user authentication, and lock it when the user cannot be authenticated anymore. In one example, the Lock/Unlock is not done continuously but from time to time. In this use case, an extremely fast detection of hacks is usually less critical, so that the results, intermediary outputs and/or digests corresponding to test biometric face samples can be computed on-the-fly, possibly from modified images in the sequence. In one embodiment, M out of N biometric face samples are replaced by test samples. The position of the test samples is random. In one example: N=6, M=3. The probability for an attacker to guess the right combination is 5%. In 95% of the times, the hack will be detected. Within 2 lock/unlock, the probability of a hack detection is 99.75%.

In a second example use case, the above described method is used for a one-time unlocking of the mobile equipment. In this case, a fast reaction is mandatory and the results, intermediary outputs and/or digests corresponding to test biometric face samples are preferably computed in advance.

Other implementations are within the scope of the claims.

What is claimed is:
1. A method used in a mobile equipment for authenticating or identifying a user based on his face, the method comprising:
   acquiring a sequence of biometric face sample corresponding to successive image frames of the user in a Trusted Execution Environment of the mobile equipment;
   in the Trusted Execution Environment, modifying or replacing some of the biometric face samples in said sequence, so as to generate a modified sequence with test biometric face samples;
   transmitting the modified sequence to a Rich Execution Environment of the mobile equipment;

classifying at least one portion of the biometric face samples using a classifier in the Rich Execution Environment, so as to generate for each classified biometric face sample a set of intermediary outputs and a classification result;

for each classified biometric face sample, sending at least some of the intermediary outputs or classification result, and/or a digest of the intermediary outputs, to the Trusted Execution Environment; and for at least one test biometric face sample, verifying the at least some of the intermediary outputs and/or result and/or digest in said Trusted Execution Environment.

2. The method of claim 1, wherein intermediary outputs and/or digests are only verified for biometric face samples or portions of biometric face samples when said classifiers delivers a positive result.

3. The method of claim 1, wherein said Rich Execution Environment has more processing cores or graphic units or hardware neural networks than said Trusted Execution Environment.

4. The method of claim 1, wherein said classifier comprises a neural network and wherein said intermediary outputs comprise some of the intermediary outputs of said neural network.

5. The method of claim 4, wherein only one or more first layer of the neural network are computed in the Rich Execution Environment, while at least one last layer is only computed in the Trusted Execution Environment.

6. The method of claim 4, wherein the at least some of the intermediary outputs are verified in the Trusted Execution Environment with a neural network equivalent to the one used in the Rich Execution Environment for computing the intermediary outputs.

7. The method of claim 1, wherein only biometric face samples corresponding to regions of images in which a face has been authenticated are verified in said Rich Execution Environment.

8. The method of claim 1, said digest being a hash of the intermediary outputs and/or result.

9. The method of claim 1, wherein the verification is based on expected values for the intermediary outputs and/or result and/or digest that were pre-computed in the Trusted Execution Environment.

10. The method of claim 1, wherein the verification is based on intermediary outputs and/or result and/or digest in said Trusted Execution Environment computed in real time in said Trusted Execution Environment.

11. The method of claim 1, wherein the modified or replaced biometric face samples in said sequence are randomly selected in said Trusted Execution Environment.

12. The method of claim 1, wherein said modified biometric face samples are modified by adding noise or a watermark.

13. The method of claim 1, wherein the replaced biometric face samples are replaced by test biometric face samples selected from a set of test biometric face samples.

14. The method of claim 1, wherein the replaced biometric face samples are replaced by test biometric face samples, the method comprising a step of selecting and storing new test biometric face samples from said acquired sequences.

15. The method of claim 1, comprising a face detection step for detecting portions of images including a face, said face detection being performed in the Rich Execution Environment and verified in the Trusted Execution Environment.

16. The method of claim 15, wherein only biometric face samples corresponding to regions of images in which a face has been detected are verified in said Rich Execution Environment.

17. The method of claim 1, comprising pre-processing said image frame in order to obtain said biometric face sample.

18. The method of claim 1, comprising unlocking said mobile equipment as soon as said user has been authenticated.

19. The method of claim 18, comprising:
a) acquiring a sequence of image frames with at least one image sensor in said Trusted Execution Environment, said image frames comprising at least one 3D image;
b) performing the method of claim 1 on a biometric sample corresponding to one image frame or to one region of an image frame where a face has been detected;
c) repeating b) until the user has been authenticated from one of said frames or regions.

20. The method of claim 18, wherein said test biometric face samples and the corresponding intermediary outputs or results or digests are processed before the acquisition of the sequence.

21. The method of claim 1, wherein the user is continuously authenticated when he is facing his mobile equipment.

22. The method of claim 21, wherein some of the biometric face samples in said sequence are randomly replaced by test biometric face samples.

23. A mobile equipment comprising:
a processor including a Trusted Execution Environment and a Rich Execution Environment, and
an electronic memory storing a program for causing said processor to perform the method of claim 1.

* * * * *